US008614929B2

(12) United States Patent
Rasolofosaon et al.

(10) Patent No.: US 8,614,929 B2
(45) Date of Patent: Dec. 24, 2013

(54) METHOD FOR INTERPRETING REPETITIVE SEISMIC DATA CONSIDERING SEISMIC FREQUENCY BAND IN THE EVALUATION OF PORE PRESSURES

(75) Inventors: Patrick Rasolofosaon, Les Ulis (FR); Bernard Zinszner, Montesson (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 504 days.

(21) Appl. No.: 12/908,130

(22) Filed: Oct. 20, 2010

(65) Prior Publication Data
US 2011/0090758 A1    Apr. 21, 2011

(30) Foreign Application Priority Data

Oct. 21, 2009 (FR) .................... 09 05050

(51) Int. Cl.
*G01V 1/30* (2006.01)
*G01N 15/08* (2006.01)
*G01V 1/28* (2006.01)

(52) U.S. Cl.
USPC ............... 367/38; 702/12; 702/13; 702/14

(58) Field of Classification Search
USPC .............. 367/37, 38, 73; 702/11–14
See application file for complete search history.

(56) References Cited

U.S. PATENT DOCUMENTS 7,752,022 B2 *    7/2010    Fornel et al. ................. 367/73
8,170,799 B2 *    5/2012    Dvorkin et al. .............. 702/11

OTHER PUBLICATIONS

Landro et al., "Pore Pressure Estimation—What can we learn from 4D", CSEG Recorder, Sep. 2002, pp. 82-87.*
Rasolofosaon, P.N.J, et al: "Complete Pressure and Fluid Dependence of Seismic Properties of Reservoir Rocks", 68th EAGE Conference and Exhibition, Paper P046, Vienna, Austria, Jun. 12-15, 2006. (5 pages).
Rasolofosaon, P.N.J., et al: "2004 Laboratory Petroacoustics for Seismic Monitoring Feasibility Study", The Leading Edge, V. 23, No. 3, pp. 252-258.
Rasolofosaon, P.N.J., et al; 2007 "The Unreasonable Success f Gassmann's Theory . . . Revisited," Journal of Seismic Exploitation, vol. 16, Nos. 2-4, pp. 281-301.
Rasolofosaon, P. et al: "Petroacoustic Characterization of Reservoir Rocks for Seismic Monitoring Studies", Revue De L'Institut Francais Du Petrole, Editions Technip. Paris, FR., vol. 58, No. 6, (Nov. 1, 2003), pp. 615-635, XP002277173, ISSN: 1294-4475.

(Continued)

*Primary Examiner* — Ian J Lobo
(74) *Attorney, Agent, or Firm* — Antonelli, Terry, Stout & Kraus, LLP.

(57) ABSTRACT

A method for exploiting underground porous media via injection or production of a fluid is disclosed, wherein repetitive seismic records are interpreted taking into consideration the seismic frequency band in the evaluation of pore pressures. After inversion of 4D seismic data, at least two sets of seismic speeds are available which correspond to different moments in time. A Hertz-type power-law is then used to evaluate pore pressures, wherein the Hertz coefficient is determined using laboratory ultrasound or sonic measures. Then the coefficients are adjusted using a measurement of the attenuation of the ultrasound or sonic waves. Fluid flow is then monitored within the porous media by determining whether variation in seismic speed is due to the variation of pore pressure or to fluid substitution, using the adjusted Hertz equation.

9 Claims, 3 Drawing Sheets

(56) References Cited

OTHER PUBLICATIONS

Rasolofosaon, P. et al: "Laboratory Petroacoustics for Seismic Monitoring Feasibility Study", The Leading Edge, Society of Exploration Geophysicists, US. LNKD-DOI:10.1190/1.1690898, (Mar. 1, 2004), pp. 252-258, XP0023992555, ISSN: 1070-485X.

Duffaut, K., et al: "$V_p/V_s$ Ratio Versus Differential Stress and Rock Consolidation—A comparison Between Rock Models and Time-Lapse AVO Data", Geophysics, Society of Exploration Geophysicists, US LNKD-DIO:10.1190/1.2752175, Vo. 72, No. 5, (Sep. 1, 2007), pp. C81-C94, XP001506262, ISSN: 0016-8033.

Long, R., et al: "Measurement of Acoustic Properties of Near-Surface Soils Using an Ultrasonic Waveguide", Geophysics, Seg, vol. 69, No. 2, (Mar. 2004)-(Apr. 2004), pp. 460-465, XP002584937.

Prioul, R., et al: "Rough Contacting Surfaces: Similarities and Differences with Traction-Free Cracks", SEG Houston 2009 International Exposition and Annual Meeting, vol. 28, 2009, pp. 3436-3440, XP002584938.

\* cited by examiner

METHOD FOR INTERPRETING REPETITIVE SEISMIC DATA CONSIDERING SEISMIC FREQUENCY BAND IN THE EVALUATION OF PORE PRESSURES

CROSS REFERENCE TO RELATED APPLICATION

Reference is made to French Priority Application Serial No. 09/05050, filed Oct. 21, 2009, entitled "Method for Interpreting Repetitive Seismic Data Considering Seismic Frequency Band in the Evaluation of Pore Pressures" which application is incorporated herein by reference in its entirety.

BACKGROUND OF THE INVENTION

1. Field of the Invention

The present invention concerns the domain of underground porous media exploitation, such as the production of hydrocarbons in an oilfield, or injection of acid gases in the subsoil.

2. Description of the Prior Art

Whether it is within the context of the production of hydrocarbons or within the context of gas injection, it is essential for successful exploitation to be able to monitor fluid flow within porous media. For example, it is necessary to determine where the hydrocarbons are located within the oilfield being exploited, and then once production has started, to monitor the hydrocarbons in view of determining how to improve production. For example, if a part of the hydrocarbons remain obstructed, it may then be decided to drill other production wells or injection wells in view of improving retrieval of the hydrocarbons.

Within the context of the injection of acid gas, such as $CO_2$, it is essential to monitor the flow of the injected gas for determining whether storage is occurring properly at the required location to evaluate the quantity that is actually stored, and to check the integrity of the reservoir to make sure there are no leaks. Using this information, it is also possible to determine whether other injection wells are necessary.

To monitor the flow of fluids that are produced or injected within porous media, there are numerous industrially-designed methods. Among such methods, the repetitive seismic method, also termed 4D seismic surveying, is used by the industry (oil or environmental). Such a method performs several seismic campaigns, at different moments in time (in general, campaigns are carried out with at least a one year interval). Thus, experts may monitor the fluid flow of the production reservoir or at the geological storage site.

Then, it is determined whether the observed variations of seismic speed (or impedance) of various acquired seismic records, at different points in time, are mainly due to variation in pressure (fluid and confinement) or due to fluid substitution of another fluid by replacing one fluid with another fluid. In other words, it is determined how fluid distributions in the reservoir vary across time.

The flow of injected or produced fluids within porous media is characterized on the basis of two sets of seismic data, via two parameters which are variation of the incompressibility module of the saturating fluid and variation of pore pressure (or fluid pressure). The first parameter indicates the type of fluid at a given point within the media and the second parameter indicates the increase of induced pressure.

These two parameters are generally determined using inversion of seismic data (speed or impedance). The Biot-Gassmann equation links the incompressibility module of a saturating fluid to seismic speed or impedance, and the Hertz-Mindlin equation links pore pressure to seismic speed or impedance The Hertz-Mindlin equation is a power-law of the type: $V = k \cdot P^h$, where V represents speed, P is pressure, k is a real number, and h is an exponent termed the Hertz coefficient. The Hertz coefficient may take on very diverse values depending on the type of rock and porosity. Values generally range from 0.005 to 0.05 for limestone, both for P and S waves, while for sandstone, values increase with porosity from 0.04 to 0.06 for P waves, and from 0.06 to 0.1 for S waves. The ratio of Hertz coefficients for S and P waves is approximately 1.6 for sandstone. This coefficient is determined using ultrasound measures (typically a few hundred kilohertz to a megahertz) for laboratory rock samples, or using acoustic survey data (typically a few kilohertz to a few dozen kilohertz). The following documents describe this procedure:

Rasolofosoan, P. N. J, Zinszner, B. E., 2006 Complete Pressure and Fluid Dependence of Seismic Properties of Reservoir Rocks. 68$^{th}$ EAGE Conference and Exhibition, Paper P046.

Rasolofosoan, P. N. J, Zinszner, B. E., 2004 Laboratory Peroacoustics for Seismic Monitoring Feasibility Study. The Leading Edge, v. 23; No. 3, p. 252-258.

Rasolofosoan, P. N. J, Zinszner, B. E., 2007, The Unreasonable Success of Gassmann's Theory ... Revisited., Journal of seismic Exploitation, volume 16, Number 2-4, 281-301.

However, the frequency band of seismic data is typically from a few hertz to a few dozen hertz. The difference of frequencies between waves used to determine the law of speed/pressure, and the waves used during seismic campaigns, may be at the source of skewed interpretations, as illustrated in FIG. 3 (described later).

SUMMARY OF THE INVENTION

The invention is an alternative method for exploitation of underground porous media, according to which 4D seismic data is interpreted using a law of seismic speed dependence (or impedance) relative to pore pressure, taking into consideration the frequency band of the seismic data. The method works, in particular, due to adjustment of the Hertz coefficient using an estimate of the attenuation of the waves used to define the Hertz coefficient.

This invention is a method OF exploitation of underground porous media via injection or production of a fluid, where at least two sets of seismic data are acquired following at least two seismic campaigns, performed at different moments in time via emission of seismic waves in the media. Two sets of seismic wave speeds are determined by inverting the data sets. A Hertz-Mindlin power law is considered, which uses a power termed Hertz coefficient to link speed of wave propagation to pore pressure. The method includes the following steps:

determining the Hertz coefficient using measurements of samples of the media via f1 frequency waves;

adjusting the Hertz coefficient to account for a difference in frequency between the f1 frequency waves and the seismic waves using a measurement of the attenuation of the f1 frequency waves in the samples;

determining, for all points of the porous media, pore pressure variation, using the power law with the adjusted Hertz coefficient, and the sets of inverted data processed by a computer; determining a location of the fluid and eventually a location of a substitution of the fluid within the porous media with another fluid, from the variations of the pore pressure; and monitoring exploitation of the underground porous media by determining the location of the fluid or the location of the another fluid.

The Hertz coefficient may be adjusted with the following formula:

$$n(f_2, P_{diff}^A) - n(f_1, P_{diff}^A) \approx \zeta \gamma (P_{diff}^A) \ln(f_2/f_1) + [n_o(f_2) - n_o(f_1)\delta(f_1)] \times P_{diff}^A$$

where:

$f_2$ is a central frequency of the seismic recordings;

$P_{diff}^X$ is a differential pressure at state X (=A or B);

$n(f, P_{diff})$ is the Hertz coefficient at frequency f and at the differential pressure $P_{diff}^X$, with $n(f_2, P_{diff}^A)$ corresponding to the adjusted Hertz coefficient, and $n(f_2, P_{diff}^A)$ corresponding to the non-adjusted Hertz coefficient;

$\gamma$ is attenuation of the P and S waves at frequency $f_1$; and $\zeta$ is a real number $n_0$ is the Hertz coefficient with differential pressures tending towards zero, $n_0(f_2)$ corresponding to the adjusted Hertz coefficient, and $n_0(f_1)$ corresponding to the non-adjusted Hertz coefficient, with differential pressures tending towards zero.

According to a preferred embodiment, the Hertz coefficient is adjusted using the following formula:

$$n_0(f_2) - n_0(f_1) \approx \zeta \cdot (P_{diff}) \ln(f_2/f_1)$$

where:

$f_2$ is a central frequency of the seismic recordings;

$n_0$ is the Hertz coefficient at differential pressures tending towards zero, with $n_0(f_2)$ corresponding to the adjusted Hertz coefficient, and $n_0(f_1)$ corresponding to the non-adjusted Hertz coefficient;

$P_{diff}$ is differential pressure in the media;

$\gamma$ is attenuation of the P and S waves at frequency $f_1$; and $\zeta$ is a real number.

Finally, according to the invention, the f1 frequencies may be ultrasound or sonic.

Other characteristics and advantages of the invention will become clear in light of the description below of non-limiting embodiments, together with reference to the appended drawings described below.

DETAILED DESCRIPTION OF THE INVENTION

Figure 1:
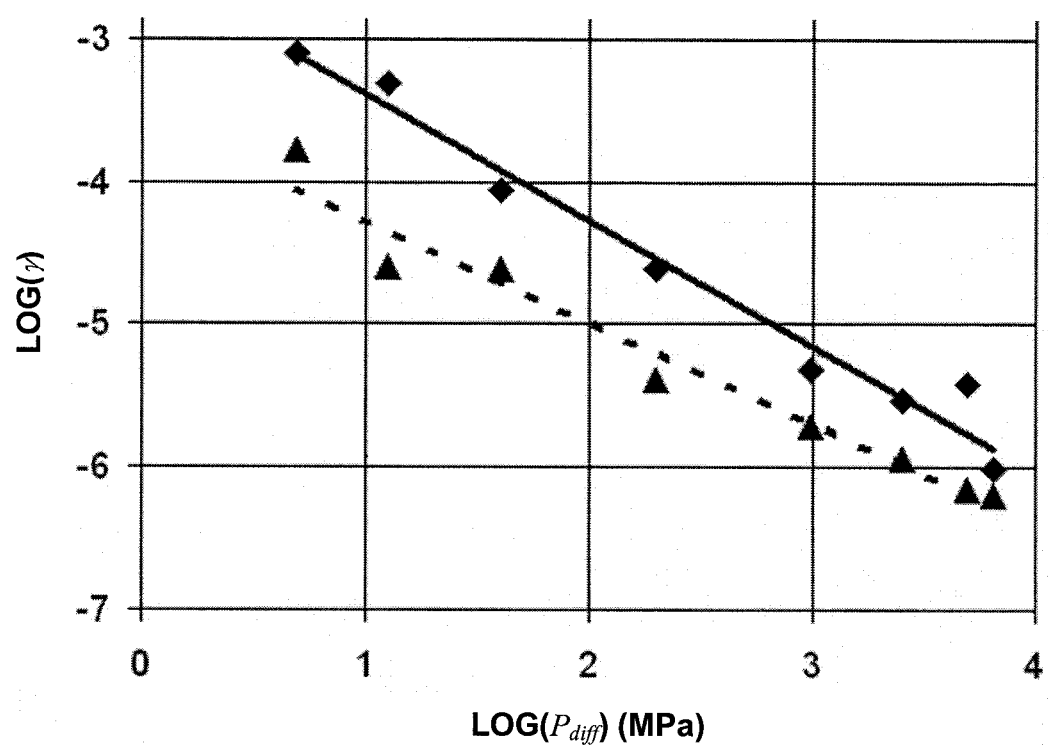
FIG. 1 illustrates, on a bi-logarithmic scale, experimental values of the attenuation of P waves (black diamonds) and of S waves (black triangles), depending on differential pressure ($P_{diff}$) measured in the laboratory. The two linear adjustments are also represented as a solid line for P waves, and as a broken line for S waves. (Fontainebleau Sandstone case)

The invention is a method for exploitation of underground porous media, according to which seismic 4D data is acquired and interpreted. The interpretation enables monitoring of fluid flow produced or injected within the porous media. The invention calculates variation of seismic speed (or impedance) observed with different seismic datasets, acquired at different periods in time, and then determines whether this variation is mainly due to pressure variation (fluid and confinement) or is due to a fluid substitution of an original fluid with another fluid. In other words, how the distribution of fluids in the reservoir varying over time is determined.

For this purpose, the Biot-Gassmann law and a law of seismic speed dependence (or impedance) according to pore pressure, taking into consideration the frequency band of seismic data is used. The method works, in particular, due to adjustment of the Hertz coefficient, using an estimate of the attenuation of the waves used to define the Hertz coefficient. The method may include the following steps:

1. Acquisition and inversion with a computer of repetitive seismic data to image the underground reservoir.
2. Calculation of the laws of dependence for seismic speed/pore pressure.
   2a. Determining the Hertz Coefficient using ultrasound or sonic waves
   2b. Determining the relation between the Hertz coefficient and wave frequency
   2c. Using of the relationship between Hertz coefficient and wave frequency
3. Interpretation of seismic images.

1. Acquisition and Inversion of Repetitive Seismic Data to Image the Underground Reservoir The purpose of seismic-reflection is to obtain an underground image. It creates a surface disturbance and records the very small surface movements of the ground due to wave reflection on the broken surfaces of the mechanical properties (hardness and compressibility) of rocks.

Repetitive seismic data, termed seismic 4D, is used in the industry (oil or environmental industries). Such a method performs several different seismic campaigns, at different periods of time (in general, there is at least a one year interval between campaigns). Thus, fluid flow of the production reservoir or of a geological storage site may be monitored by comparing the images received during each of the campaigns.

According to the invention, two sets of seismic data are acquired via at least two seismic campaigns, performed at different periods of time, via emission of seismic waves into the media.

Then, the seismic amplitude data sets are transformed into seismic impedances or into seismic speeds. For this purpose, stratigraphic inversion is used which is a well-known process implemented in computers. Advantageously, an inversion prior to summation may be used.

2. Calculation of the Laws of Dependence for Seismic Speed/Pore Pressure

2a. Determining the Hertz Coefficient Using Ultrasound or Sonic Waves

The equations used are a Hertz-Mindlin type. These are power laws of the type: $V = k \cdot P^h$, where V represents speed, P pressure, k is a real number, and h is an exponent which is termed the Hertz coefficient. The Hertz coefficient may take on very diverse values depending on the type of rock and porosity.

Calculation of the laws of dependence for seismic speed/pore pressure calibrates the Hertz coefficient according to several fluid saturation values. On a discrete level, it is possible to have a curve for a sample completely saturated with water, another for a sample totally saturated with gas or oil. The following documents describe this procedure:

Rasolofosoan, P. N. J, Zinszner, B. E., 2006 Complete Pressure and Fluid Dependence of Seismic Properties of Reservoir Rocks. 68th EAGE Conference and Exhibition, Paper P046.

Rasolofosoan, P. N. J, Zinszner, B. E., 2004 Laboratory Peroacoustics for Seismic Monitoring Feasibility Study. The Leading Edge, v. 23; No. 3, p. 252-258.

Rasolofosoan, P. N. J, Zinszner, B. E., 2007, The Unreasonable Success of Gassmann's Theory . . . Revisited., Journal of Seismic Exploitation, volume 16, Number 2-4, 281-301.

Using ultrasound measures obtained in the laboratory for the reservoir sample under consideration, speed/impedance of different fluids depending on pore pressure Pp was measured (cf. Rasolofosoan and Zinszner 2004, 2006 and 2007). Then calibration curves were calculated such as those appearing in FIG. 3.

The calibration curves may also be obtained via acoustic survey measurements, relative to sonic frequencies rather than ultrasound frequencies, such as those of the laboratory. Sonic calibration curves are obviously less detailed than those of the laboratory, as there are only a few P and S speed measurements, for various fluid pressures in the reservoir, which are traditionally measured simultaneously using other acoustic surveying methods (for example PLT, etc. . . . )

The calibration curves are thus obtained either for sonic frequencies or for ultrasound frequencies, rather than seismic frequencies. However, a calibration curve depends in an important way on frequency (solid line curves compared to broken line curves on FIG. 3).

2b. Determining the Relationship Between the Hertz Coefficient and Wave Frequency To adjust for the frequency effect, according to the invention, the curve with a measure of the ultrasound attenuation of P and S waves is modified, for the case of calibration using ultrasound frequencies in the laboratory, and with a measurement of sonic attenuation of P and S waves for the case of calibration using sonic frequencies from acoustic surveys. These traditional attenuation measures are fairly well known in the literature and described in detail in various publications. See for example, For Measures of Ultrasound Attenuations: Bourbié, T, Coussy, O., Zinszner, B., 1987, Acoustics of Porous Media, Editions Technip, Paris, and for Sonic Measures of Attenuation: Serra, O., 2008, The Well Logging Handbook, Editions Technip, Paris.

Specifically, a relationship is defined, allowing modification of the Hertz coefficient which was previously determined (Step 2a.) relative to attenuation of the waves used to determine the coefficient (of frequency f1) and of the seismic frequency (f2).

According to a preferred embodiment, the formula that is used is the following:

$$n_0(f_2) - n_0(f_1) \approx \zeta \cdot (P_{diff}) \ln(f_2/f_1)$$

The formulas for conversion from ultrasound frequency speed to speed of seismic frequencies, using P and S attenuations are detailed below.

The following notations are used in the description of the invention:

$P_{diff}$ is differential pressure in a reservoir which is a difference between confinement pressure and pore pressure.

$P_{conf}$ is confinement pressure and sediment pressure.

$P_{pore}$ is pore pressure and pressure within the fluid contained in the reservoir.

f is frequency.

$P_{diff}^X$ is differential pressure at state X (=A or B).

$n(f, P_{diff})$ is the exponent of the Hertz equation to frequency f and to differential pressure $P_{diff}$. Additionally, it is assumed that the Hertz exponent $n(f, P_{diff})$ is only slightly dependent on differential pressure, that is: $n(f, P_{diff}) = n_0((f)(1+\delta(f) \times P_{diff})$.

$\delta$ is a frequency function, independent of differential pressure $P_{diff}$ and homogenous, the inverse of pressure.

$\gamma$ is attenuation ($\gamma_P$ and $\gamma_S$, respectively of P waves and S waves)

$$\gamma = \frac{1}{\pi} \tan^{-1}\left(\frac{1}{Q}\right)$$

Q is a quality factor independent of frequency (Q-constant model)

$\zeta$ is the exponent of the assumed power equation which links attenuation $\gamma$ to differential pressure $P_{diff}$ $\Delta P_{diff}$ is the increase in differential pressure between two states A and B:

$$\Delta P_{diff} = P_{diff}^B - P_{diff}^A$$

The frequencies $f_1$ and $f_2$ are any two frequencies between which the attenuation speed equations will be used. For example, if there is concern with conversion from sonic speed to seismic speed, the frequency $f_1$ designates the central frequency of the sonic tool (typically close to a kilohertz) and frequency $f_2$ designates the central frequency of seismic records (typically a few hertz to a few dozen hertz).

$n_0$ is the Hertz coefficient for differential pressures tending towards zero ($P_{diff} \approx 0$)

Differential pressure $P_{diff}$ in a reservoir is equal to the difference between confinement pressure $P_{conf}$, which is approximately equal to geostatic pressure due to the weight of subjacent sediments, and pore pressure $P_{pore}$, or the pressure within the fluid contained in the reservoir:

$$P_{diff} = P_{conf} - P_{pore} \qquad (1)$$

It has been determined that seismic, speed and attenuation properties are essentially functions of differential pressure $P_{diff}$ rather than particular individual values of confinement pressure $P_{conf}$ or of pore pressure $P_{pore}$. See for example, Rasolofosoan and Zinszner, 2006.

The most simple power equation linking speed P or S and differential pressure $P_{diff}$ to frequency f, or the Hertz-Mindlin Law should be considered (see Rasolofosoan and Zinszner, 2004):

$$V(P_{diff}^A, f)/V(P_{diff}^B, f) = (P_{diff}^A/P_{diff}^B)^{n(f, P_{diff})} \qquad (2)$$

where $P_{diff}^X$ is the differential pressure at state X (=A or B), and $n(f, P_{diff})$ designates the Hertz equation exponent to frequency f and to differential pressure $P_{diff}$. Additionally, it is assumed that the Hertz exponent $n(f, P_{diff})$ only slightly depends on differential pressure, that is:

$$n(f, P_{diff}) = n_0((f)(1+\delta(f) \times P_{diff}) \qquad (3)$$

where frequency and pressure dependencies of n are decoupled, and where the hypothesis of a slight dependence of n relative to $P_{diff}$ imposes that:

$$|\delta(f) \times P_{diff}| << 1 \qquad (4)$$

$\delta$ is a frequency function, independent of differential pressure $P_{diff}$ and homogenous and is the inverse of pressure.

Otherwise, an equation linking attenuation is introduced:

$$\gamma = \frac{1}{\pi}\tan^{-1}\left(\frac{1}{Q}\right)$$

Q is the quality factor in a Q-constant model, independent of frequency (Bourbié et al. 1987)] and differential pressure. It is assumed this is also a power equation characterized by an exponent $\zeta$:

$$\gamma(P_{diff}^A)/\gamma(P_{diff}^B) = (P_{diff}^A/P_{diff}^B)^\zeta \qquad (5)$$

FIG. 1 illustrates, on a bi-logarithmic scale, experimental values of the attenuation $\gamma$ of P waves (black diamonds) and of S waves (black triangles), depending on differential pressure ($P_{diff}$) measured at the laboratory. The two linear adjustments are also represented with a solid line for P waves, and with a broken line for S waves. (Fontainebleau sandstone case).

Otherwise, if it is accepted that the attenuation model is Q-constant (Bourbié et al. 1987) the following attenuation relationship with differential pressure ($P_{diff}$) is obtained:

$$V(P_{diff}, f_2)/V(P_{diff}, f_1) = (f_2/f_1)^{\gamma(P_{diff})} \qquad (6)$$

Equation (3) incorporated into (2) then yields:

$$\frac{V(P_{diff}^A, f)}{V(P_{diff}^B, f)} = \frac{(P_{diff}^A)^{n_o(f)(1+\delta(f)\times P_{diff}^A)}}{(P_{diff}^B)^{n_o(f)(1+\delta(f)\times P_{diff}^B)}} = \qquad (7)$$

$$\left(\frac{P_{diff}^A}{P_{diff}^B}\right)^{n_o(f)(1+\delta(f)\times P_{diff}^A)} (P_{diff}^B)^{-n_o(f)\delta(f)\times \Delta P_{diff}}$$

Where $\Delta P_{diff} = P_{diff}^B - P_{diff}^A$ designates the increase in differential pressure than is assumed to be low, that is:

$$\Delta P_{diff} \ll P_{diff}^A \qquad (8)$$

Additionally, the member to member relation of both attenuation equations (6) written with differential pressures $P_{diff}^A$ and $P_{diff}^B$ is reduced to:

$$V(P_{diff}^A, f_2)/V(P_{diff}^B, f_2) = (V(P_{diff}^A, f_1)/V(P_{diff}^B, f_1))(f_2/f_1)^{\gamma(P_{diff}^A)-\gamma(P_{diff}^B)} \qquad (9)$$

Equations (7) and (9) yield:

$$\left(\frac{P_{diff}^A}{P_{diff}^B}\right)^{n_o(f_2)(1+\delta(f_2)\times P_{diff}^A)-n_o(f_1)(1+\delta(f_1)\times P_{diff}^A)} \qquad (10)$$

$$(P_{diff}^B)^{-[n_o(f_2)\delta(f_2)-n_o(f_1)\delta(f_1)]\times \Delta P_{diff}} = \left(\frac{f_2}{f_1}\right)^{\gamma(P_{diff}^A)-\gamma(P_{diff}^B)}$$

That is, taking the logarithm of each member:

$$[n_o(f_2)(1+\delta(f_2)\times P_{diff}^A) - n_o(f_1)(1+\delta(f_1)\times P_{diff}^A)]\ln\left(\frac{P_{diff}^A}{P_{diff}^B}\right) - \qquad (11)$$

$$[n_o(f_2)\delta(f_2) - n_o(f_1)\delta(f_1)]\times \Delta P_{diff} = [\gamma(P_{diff}^A) - \gamma(P_{diff}^B)]\ln\left(\frac{f_2}{f_1}\right)$$

Assuming that the increase in differential pressure $\Delta P_{diff} = P_{diff}^B - P_{diff}^A$ is slight, $P_{diff}^A$ and $P_{diff}^B = P_{diff}^A + \Delta P_{diff}$ are not too different from each other, and consequently, the relationship is obtained:

$$\ln\left(\frac{P_{diff}^A}{P_{diff}^B}\right) = \ln\left(\frac{P_{diff}^A}{P_{diff}^A + \Delta P_{diff}}\right) \approx -\frac{\Delta P_{diff}}{P_{diff}^A} \qquad (12)$$

Similarly, with the same hypothesis, assuming $\gamma(P_{diff}^B) = \gamma(P_{diff}^A) + \Delta\gamma$, the logarithmic differential of equation (5) yields:

$$\frac{\Delta\gamma}{\gamma(P_{diff}^A)} \approx \zeta\frac{\Delta P_{diff}}{P_{diff}^A} \qquad (13)$$

Equations (12) and (13) incorporated into equation (11) yield:

$$-[n_o(f_2)(1+\delta(f_2)\times P_{diff}^A) - n_o(f_1)(1+\delta(f_1)\times P_{diff}^A)]\left(\frac{\Delta P_{diff}}{P_{diff}^A}\right) - \qquad (14)$$

$$[n_o(f_2)\delta(f_2) - n_o(f_1)\delta(f_1)]\times \Delta P_{diff} \approx -\zeta\gamma(P_{diff}^A)\left(\frac{\Delta P_{diff}}{P_{diff}^A}\right)\ln\left(\frac{f_2}{f_1}\right)$$

That is, dividing each member by $$\left(\frac{\Delta P_{diff}}{P_{diff}^A}\right):$$

$$n(f_2, P_{diff}^A) - n(f_1, P_{diff}^A) \approx \zeta\gamma(P_{diff}^A)\ln(f_2/f_1) + [n_o(f_2)\delta(f_2) - n_o(f_1)\delta(f_1)]\times P_{diff}^A \qquad (15)$$

This equation corresponds to the desired ratio, linking attenuation contained in the first term of left member to $\ln(f_2/f_1)$ and the pressure effect, coupled to frequency dependence, contained in the second term of the left member. The two equal members are functions of the first order frequency, and differential pressure. More precisely, the first order interference hypothesis includes, on the one hand, the low dependence hypothesis of n relative to $P_{diff}$ [condition (4)], and on the other hand, the low increase in differential pressure hypothesis $\Delta P_{diff} = P_{diff}^B - P_{diff}^A$ [condition (8)].

At zero order, due to condition (4), equation (15) is considerably simplified, reducing to:

$$n_0(f_2) - n_0(f_1) \approx \zeta\cdot\gamma(P_{diff})\ln(f_2/f_1) \qquad (16)$$

In other words, at zero order, $\gamma$ dependence relative to differential pressure is insignificant. It is always possible to use the full equation (15).

2c. Use of the Relationship Between Hertz Coefficient and Wave Frequency

Figure 2:
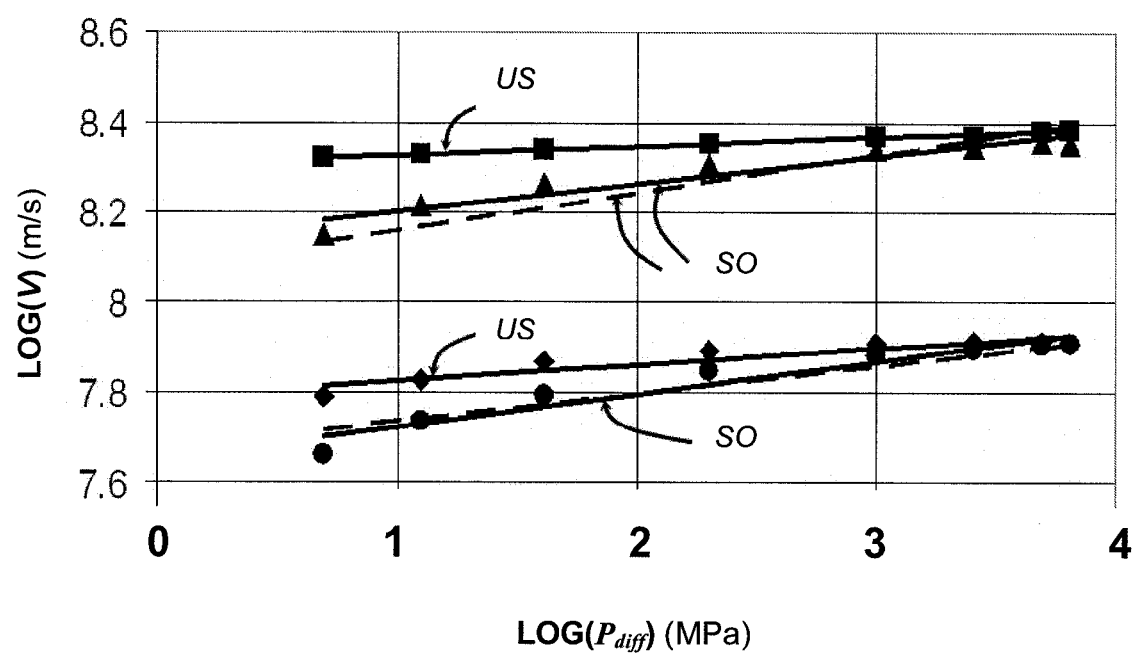
FIG. 2 illustrates ultrasonic experimental speed (US curves refer to 'ultrasound') and sonic speed (SO curves refer to 'sonic') for P waves (squares and triangles) and S waves (diamonds and circles) depending on differential pressure ($P_{diff}$), on a bi-logarithmic scale. Theoretical predictions of sonic speeds P and S (broken lines) are compared to the experimental sonic speeds. (Fontainebleau Sandstone case)

Using this relationship, new Hertz coefficients are determined, and thus define a new law of seismic speed/pore pressure dependencies. This law was well verified on an experimental basis as illustrated in FIG. 2. FIG. 2 illustrates ultrasonic experimental speeds (US refers to 'ultrasonic' curves) and sonic speeds (SO refers to 'sonic' curves) of P waves (squares or triangles) and of S waves (diamonds and circles) relative to differential pressure ($P_{diff}$) on a bi-logarithmic scale. Theoretical predictions of P and S wave speeds (as broken lines) are compared to experimental sonic speeds. Linear adjustments of this experimental data are excellent, validating once again the Hertz law. Additionally, the theoretical predictions of P and S wave speeds (as broken lines), summarized in formula (16) are altogether comparable to experimental sonic speeds.

Thus, on the one hand, the Hertz coefficient of the power law between speed and differential pressure (equation 2) is not the same for different frequency bands, and on the other hand, this is verified on an experimental basis, and predicted by the simplified formula (16).

Thus new seismic speed/pore pressure dependence curves relative to seismic frequencies, are obtained.

3. Interpretation of Seismic Images

The interpretation of seismic images, arising out of 4D seismic data and inversion, is designed to determine whether the variation of seismic speeds (or impedances) observed for different seismic data, acquired at different periods of time, is mainly due to variation in pressure (fluid and confinement), or to fluid substitution. The monitoring of fluid flow, produced or injected within the porous media, is characterized by two parameters, using two sets of seismic data which are variation of the incompressibility module of the saturating fluid and variation of pore pressure. The first parameter indicates the type of fluid at a given point in the media, and the second indicates an increase in induced pressure.

These two parameters are generally determined using inverted seismic data (speed or impedance). The Biot-Gassmann law links, among other items, the incompressibility module of the saturating fluid to seismic speed or impedance, and the Hertz-Mindlin law links pore pressure to seismic speed or impedance.

According to the invention, the Hertz-Mindlin law is used with a modified Hertz coefficient according to Step 2.

Figure 3:
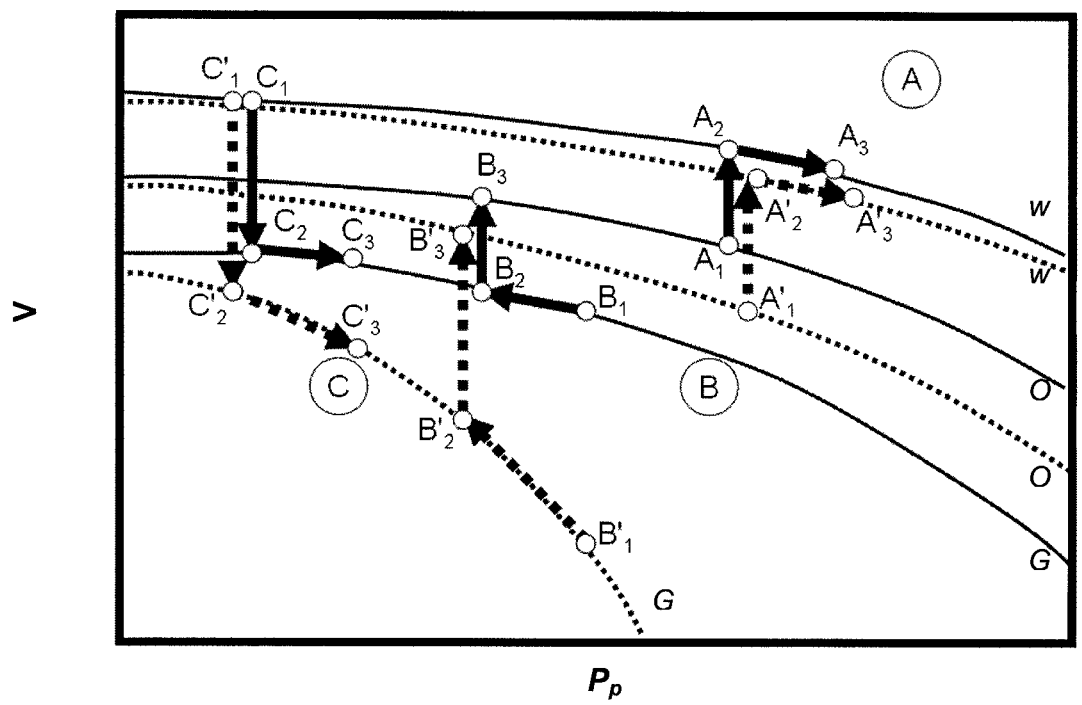
FIG. 3 illustrates interpretation results according to the invention.

FIG. 3 illustrates interpretation results according to the invention. In FIG. 3 speed V relative to pore pressure Pp is represented, in a typically clastic rock reservoir (sandstone), saturated with water (W), oil (O), or gas (G), and according to three types of exploitations which are water flooding (markers A), gas production (markers B) and gas injection (markers C), such as CO2, in a saline waterzone. The seismic speed curves according to the invention are indicated as solid line curves, and the "traditional" ultrasonic speeds are indicated as broken line curves.

Seismic speed increases with differential pressure $P_{diff}$ as indicated in FIG. 2 and in equation 2. Since the confinement pressure $P_{conf}$, equal to geostatic pressure due to the weight of sediments, remains approximately constant during exploitation of a reservoir, only the pore pressure $P_{pore}$ varies substantially. Also, for an increase in pore pressure, there is a decrease in differential pressure, and thus, a decrease in seismic speed or impedance, as shown on FIG. 3. According to equation (16), this effect is much more significant for low frequencies, for example for seismic frequencies (typically of a few hertz to a few dozen hertz), than for high frequencies, for example ultrasonic frequencies from the laboratory (typically of a few hundred kilohertz to a megahertz).

Thus, gas injection (markers C), such as CO2 injection in a saline waterzone, are considered. If reliance is placed on ultrasonic data from the laboratory, during gas injection (markers C) in a reservoir, pore pressure increases (state $C_2$ to $C_3$), and induces a decrease in impedance that is considerably less important than that which is induced when gas is a substitute for water (state $C_1$ to $C_2$) in the same exploitation mode. In contrast, still using the same mode of exploitation, in the seismic frequency band (broken line curves), an increase in pore pressure (state $C'_1$ to state $C'_2$) may induce a decrease in impedance that is altogether comparable to that which is induced via substitution of water by gas (state $C'_2$ to state $C'_3$).

Thus, interpretation of 4D seismic data based exclusively on the law of ultrasonic speed-pressure obtained in the laboratory leads to erroneous conclusions that substitution of fluids relative to pore pressure variations has a major effect.

The phenomenon is even more pronounced with gas production (markers B). If reliance is placed on ultrasonic data from the laboratory, during gas production in a reservoir, pore pressure decreases (state $B_1$ to state $B_2$), and thus induces an increase in impedance which is considerably less important than that which is induced when gas is substituted with oil (state $B_2$ to state $B_3$) for the same mode of exploitation. In contrast, still using the same exploitation mode, in the seismic frequency band (broken line curves), a decrease in pore pressure (state $B'_1$ to state $B'_2$) may induce an impedance variation that is even more important than for gas injection (state $C'_2$ to state $C'_3$), and altogether comparable to that which is induced by the substitution of gas with oil (state $B'_2$ to state $B'_3$). Thus, interpretation of 4D seismic data, exclusively based on the ultrasonic speed-pressure law obtained in the laboratory, once again leads to an erroneous conclusion that substitution of fluids compared to pore pressure variations has a major impact.

For the case of retrieval assisted by water flooding (markers A), the phenomenon is far less significant. Indeed, the influence of pore pressure measured by ultrasounds (state $A_2$ to state $A_3$) appears altogether comparable to that which is measured using seismic frequencies (state $A'_2$ to state $A'_3$). However, the influence of fluid substitution of one fluid with another fluid appears slightly more pronounced for seismic frequencies (state $A'_1$ to state $A'_2$) than for ultrasound frequencies (state $A_1$ to state $A_2$).

The invention thus enables contribution to the correct interpretation of 4D seismic data within the context of underground exploitation operations, such as gas injection, gas production or water flooding (FIG. 1), whether in the environmental domain (geological storage of CO2), or in the domain of the oil or gas industry. The invention has application in underground reservoir exploitation (seismic 'monitoring'), drilling (problem of security-evaluation of fluid pressures underground), and in the evaluation of fluid systems (modeling of fluid migrations).

Indeed, the invention enables enhanced distinguishing between variations in pressure (fluid and confinement) and fluid substitution in the observed changes of different kinds of seismic data, acquired at different periods of time, and consequently for providing a more realistic reservoir model at a distance from the wells, and a better production reference ("history matching"), and thus better predictions for exploitation of the reservoir.

The main "benefits" of the invention are for reservoir management. Indeed, the invention enables a better description of how fluid distribution varies across time in the reservoir. These "benefits" may be regrouped according to the following problematic situations:

Compartmentalization of the reservoir: The invention enables retrieving different reservoir compartments, and consequently, for estimation of volumes of oil or gas which have not been retrieved (in the domain of the oil industry), or to identify and estimate the volumes of CO2 effectively stored underground, and to control the integrity of the layout (in the environmental domain).

Connectivity of different compartments. The invention enables retrieving of various different compartments of the reservoir and flooding of the compartments with various fluids. This enables better decision-making for exploitation of the reservoir (positioning of new wells for example in the domain of the oil industry, integrity of the layout for storage of CO2, leakage or not of CO2 . . . ).

Distribution of fluid contacts: The invention, allows better monitoring of the spatial contact of fluids during production, enables confirmation of, or to the contrary, invalidation of a flow model, and consequently enables the production of oil to modify its retrieval program. In the environmental domain, this enables monitoring more discriminately the CO2 front stored underground.

The invention claimed is:

1. A method of exploiting underground porous media by injection of a fluid or production of a fluid comprising:
   acquiring at least two sets of seismic data, from at least two seismic campaigns, performed at different times, by emission of seismic waves within the media;
   determining two sets of speeds of the seismic waves by inversion with a computer of the at least two sets of seismic data, and using a Hertz-Mindlin power law to link the speed of wave propagation to pore pressure using a Hertz coefficient of the power law,
   determining the Hertz coefficient by measurement of samples obtained from the media using waves of frequencies f1;
   adjusting the Hertz coefficient to account for a frequency difference between the waves of frequencies f1 and the seismic waves by using measurements of attenuation of the waves of the frequency f1 of the samples;
   determining for any point of the porous media a variation of the pore pressure by the power law using the adjusted Hertz coefficient and the sets of inverted data;
   determining a location of the fluid or a location of another fluid substituted within the porous media from the variations of the pore pressure; and
   monitoring exploitation of the underground porous media by determining the location of the fluid or the location of the another fluid in the porous medium.

2. A method according to claim 1, wherein the Hertz coefficient is adjusted using a formula:

$$n(f_2, P_{diff}^A) - n(f_1, P_{diff}^A) \approx \zeta \gamma (P_{diff}^A) \ln(f_2/f_1) + [n_o(f_2) - n_o(f_1)\delta(f_1)] \times P_{diff}^A$$

where:
   f2 is a central frequency of the seismic recordings;
   $P_{diff}^X$ is a differential pressure of at state X which equals A or B;
   n(f,Pdiff) is the Hertz coefficient at frequency f and at a differential pressure Pdiff, with $n(f2, P_{diff}^A)$ corresponding to the adjusted Hertz coefficient and $n(f1, P_{diff}^A)$ corresponding to the unadjusted Hertz coefficient;
   γ is attenuation of the P and S waves at frequency f1;
   ζ is a real number; and
   $n_o$ is the Hertz coefficient with differential pressures approaching towards zero, $n_o(f2)$ corresponding to the adjusted Hertz coefficient and $n_o(f1)$ corresponding to the unadjusted Hertz coefficient at differential pressures approaching zero.

3. A method according to claim 1, wherein the Hertz coefficient is adjusted with a following formula:

$$n_o(f2) - n_o(f1) \approx \zeta \gamma (P\text{diff}) \ln(f2/f1)$$

with:
   f2 is a central frequency of the seismic recordings;
   $n_o$ is the Hertz coefficient at differential pressures approaching zero, $n_o(f2)$ corresponding to the adjusted Hertz coefficient, and $n_o(f1)$ corresponding to the unadjusted Hertz coefficient;
   Pdiff is a differential pressure in the media;
   γ is attenuation of the P and S waves at frequency f1; and
   ζ is a real number.

4. A method according to claim 1, wherein the f1 frequencies are ultrasonic frequencies.

5. A method according to claim 2, wherein the f1 frequencies are ultrasonic frequencies.

6. A method according to claim 3, wherein the f1 frequencies are ultrasonic frequencies.

7. A method according to claim 1, wherein the f1 frequencies are sonic frequencies.

8. A method according to claim 2, wherein the f1 frequencies are sonic frequencies.

9. A method according to claim 3, wherein the f1 frequencies are sonic frequencies.

* * * * *